United States Patent
Kim et al.

(10) Patent No.: US 11,958,332 B2
(45) Date of Patent: Apr. 16, 2024

(54) VEHICLE COOLING/HEATING SYSTEM

(71) Applicants: Hyundai Motor Company, Seoul (KR); Kia Corporation, Seoul (KR)

(72) Inventors: Jong Won Kim, Chungcheongnam-do (KR); Sang Shin Lee, Gyeonggi-do (KR); Uk Il Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 13 days.

(21) Appl. No.: 17/494,150

(22) Filed: Oct. 5, 2021

(65) Prior Publication Data
US 2022/0355639 A1    Nov. 10, 2022

(30) Foreign Application Priority Data
May 4, 2021   (KR) .................... 10-2021-0058087

(51) Int. Cl.
*B60H 1/00*     (2006.01)
*B60H 1/14*     (2006.01)
*B60H 1/32*     (2006.01)

(52) U.S. Cl.
CPC ..... *B60H 1/00007* (2013.01); *B60H 1/00278* (2013.01); *B60H 1/00571* (2013.01); *B60H 1/00814* (2013.01); *B60H 1/00921* (2013.01); *B60H 1/143* (2013.01); *B60H 1/3207* (2013.01); *B60H 1/3228* (2019.05); *B60H 2001/00307* (2013.01); *B60H 2001/00928* (2013.01)

(58) Field of Classification Search
CPC ............ B60H 1/00007; B60H 1/00278; B60H 1/00571; B60H 1/00814; B60H 1/00921; B60H 1/143; B60H 1/3207; B60H 1/3228; B60H 2001/00307; B60H 2001/00928; B60H 1/3233; B60H 1/00907; B60H 1/2221; B60H 3/0085; B60H 2001/3283
See application file for complete search history.

(56) References Cited

U.S. PATENT DOCUMENTS 5,390,505 A  *  2/1995  Smith .................... F28D 7/0066
                                                   62/90
6,843,312 B2 *  1/2005  Burk ....................... B60H 1/025
                                                   237/5
(Continued)

FOREIGN PATENT DOCUMENTS

CN      105695301 A  *  6/2016   ......... B60H 1/00585
DE      10006513 B4  *  12/2014  ............. B60H 1/025
(Continued)

*Primary Examiner* — Ljiljana V. Ciric
(74) *Attorney, Agent, or Firm* — Fox Rothschild LLP

(57) ABSTRACT

A vehicle cooling/heating system includes a coolant line in which coolant is circulated between a heat source component of a vehicle that provides waste heat and a chiller and a refrigerant line in which refrigerant is circulated through a compressor, a condenser, an expansion valve, and an evaporator. The refrigerant line performs indoor cooling through the evaporator. A controller controls the coolant line such that, during a drying mode in which it is necessary to dry the evaporator, the coolant in the coolant line is circulated or not circulated through the heat source component and the chiller, and such that the refrigerant in the refrigerant line flows, in order, through the compressor, the evaporator, and the chiller.

14 Claims, 4 Drawing Sheets

(56) References Cited

U.S. PATENT DOCUMENTS

| | | | | |
|---|---|---|---|---|
| 7,971,447 B2 * | 7/2011 | Maitre | B60H 1/00278 165/104.11 |
| 8,402,776 B2 * | 3/2013 | Johnston | B60L 50/40 62/79 |
| 9,656,535 B2 * | 5/2017 | Heyl | B60H 1/00921 |
| 9,758,012 B2 * | 9/2017 | Johnston | B60H 1/00921 |
| 9,947,975 B2 * | 4/2018 | Porras | H01M 10/625 |
| 9,950,638 B2 * | 4/2018 | Porras | B60L 58/26 |
| 10,293,706 B2 * | 5/2019 | Porras | B60H 1/00385 |
| 10,384,511 B2 * | 8/2019 | Porras | B60H 1/32281 |
| 10,875,385 B2 * | 12/2020 | Durrani | B60H 1/32284 |
| 11,207,941 B2 * | 12/2021 | Lee | B60H 1/00885 |
| 11,214,126 B2 * | 1/2022 | Hötzel | B60H 1/321 |
| 11,342,603 B2 * | 5/2022 | Tomai | B60L 58/25 |
| 11,407,275 B2 * | 8/2022 | Durrani | B60H 1/32284 |
| 11,485,252 B2 * | 11/2022 | Lee | H01M 10/625 |
| 11,732,967 B2 * | 8/2023 | Rousselet | G05B 13/042 700/282 |
| 11,752,833 B2 * | 9/2023 | Durrani | B60H 1/143 165/202 |
| 11,794,550 B2 * | 10/2023 | Kim | B60H 1/143 |
| 2008/0251235 A1 * | 10/2008 | Zhou | B60L 50/51 165/59 |
| 2009/0280395 A1 * | 11/2009 | Nemesh | H01M 10/615 429/62 |
| 2009/0317697 A1 * | 12/2009 | Dogariu | B60H 1/00278 429/62 |
| 2010/0009246 A1 * | 1/2010 | Maitre | H01M 10/633 165/104.31 |
| 2011/0296855 A1 * | 12/2011 | Johnston | B60L 50/40 62/160 |
| 2012/0297809 A1 * | 11/2012 | Carpenter | B60L 58/26 62/239 |
| 2013/0074525 A1 * | 3/2013 | Johnston | B60H 1/323 62/126 |
| 2013/0298583 A1 * | 11/2013 | O'Donnell | B60H 1/323 62/115 |
| 2014/0216709 A1 * | 8/2014 | Smith | B60H 1/00392 165/41 |
| 2014/0326430 A1 * | 11/2014 | Carpenter | B60H 1/00278 165/41 |
| 2015/0101789 A1 * | 4/2015 | Enomoto | B60H 1/039 236/35 |
| 2015/0217623 A1 * | 8/2015 | Hatakeyama | B60L 1/02 429/62 |
| 2016/0107506 A1 * | 4/2016 | Johnston | B60H 1/00278 165/202 |
| 2016/0318409 A1 * | 11/2016 | Rawlinson | B60L 1/003 |
| 2016/0318410 A1 * | 11/2016 | Rawlinson | B60L 58/27 |
| 2016/0339761 A1 * | 11/2016 | Enomoto | B60H 1/00899 |
| 2016/0344075 A1 * | 11/2016 | Blatchley | B60W 10/30 |
| 2017/0008407 A1 * | 1/2017 | Porras | B60H 1/00921 |
| 2017/0197488 A1 * | 7/2017 | Kim | H01M 10/625 |
| 2017/0297407 A1 * | 10/2017 | Shan | B60H 1/00278 |
| 2017/0317393 A1 * | 11/2017 | Blatchley | H01M 10/613 |
| 2018/0001784 A1 * | 1/2018 | Porras | B60K 11/02 |
| 2018/0006347 A1 * | 1/2018 | Porras | H01M 10/486 |
| 2018/0215231 A1 * | 8/2018 | Porras | B60H 1/323 |
| 2019/0351734 A1 * | 11/2019 | Porras | B60H 1/32281 |
| 2022/0297504 A1 * | 9/2022 | Schroeder | B60H 1/32281 |
| 2022/0355639 A1 * | 11/2022 | Kim | B60H 1/00921 |
| 2022/0379681 A1 * | 12/2022 | Kim | B60H 1/00485 |
| 2022/0402336 A1 * | 12/2022 | Tada | B60H 1/32284 |
| 2022/0410665 A1 * | 12/2022 | Schroeder | B60H 1/00907 |
| 2023/0074313 A1 * | 3/2023 | Mazaira | B60H 1/00828 |
| 2023/0322048 A1 * | 10/2023 | Durrani | F25B 25/005 62/115 |

FOREIGN PATENT DOCUMENTS

| | | | | |
|---|---|---|---|---|
| DE | 102019100710 A1 * | 7/2019 | | B60L 50/66 |
| DE | 102017216778 B4 * | 7/2020 | | B60H 1/00914 |
| DE | 102019126850 A1 * | 4/2021 | | B60H 1/00542 |
| DE | 102010026353 B4 * | 10/2021 | | B60H 1/00785 |
| FR | 2898544 A1 * | 9/2007 | | B60H 1/00907 |
| FR | 3034712 A1 * | 10/2016 | | B60H 1/00278 |
| KR | 10-1558611 B1 | 10/2015 | | |

* cited by examiner

VEHICLE COOLING/HEATING SYSTEM

CROSS-REFERENCE TO RELATED APPLICATION

This application claims the benefit of Korean Patent Application No. 10-2021-0058087, filed on May 4, 2021, the disclosure of which is herein incorporated by reference in its entirety.

BACKGROUND OF THE DISCLOSURE

1. Field of the Disclosure

The present disclosure relates to a vehicle cooling/heating system that dries an evaporator using waste heat from heat source components of a vehicle during a drying mode in which drying of the evaporator is required for hygiene management of an air conditioner evaporator of the vehicle.

2. Description of the Prior Art

In a vehicle air conditioning system, cooling is accomplished by transmitting cooled air into the interior of the vehicle through a refrigerant cycle in which compression, condensation, expansion, and evaporation are performed. In particular, moisture may be condensed on fins inside the evaporator core of an evaporator for evaporating the refrigerant, and condensed water may be generated. When the condensed water is generated, mold, bacteria, etc. may grow on the fins inside the evaporator core of the evaporator. When mold, bacteria, etc. grow on the fins inside the evaporator core of the evaporator, odors are generated when the air conditioner of the vehicle is operated.

To prevent odors from being generated when a vehicle cooling/heating system is operated as described above, conventionally, "after-blow", i.e., a technique of directly removing mold, bacteria, or the like by drying the evaporator by operating a blower for a certain period of time or using a sterilizer that uses ultraviolet rays or the like after the operation of the vehicle is completed. However, in such a case, it may be impossible to effectively remove the condensed water from the fins inside the evaporator core of the evaporator. Further, in the case of the sterilizer, substantial costs may be incurred in terms of time and legal regulations when the sterilizer is applied to mass production, due to, for example, harm to humans. Accordingly, unlike the prior art, there is a need to develop a vehicle heating/cooling system that more rapidly and effectively dries the inside of the evaporator using the waste heat generated inside the vehicle.

The matters described above as the background art are provided merely for promoting the understanding of the background of the present disclosure, and the foregoing description of the background art should not be construed as admitting that the matters described above correspond to the prior art already known to those skilled in the art.

SUMMARY OF THE DISCLOSURE

The present disclosure has been proposed to solve the problems described above, and provides a vehicle cooling/heating system including a coolant line and a refrigerant line, wherein, during the king mode in which it is necessary to dry the evaporator, a controller configured to control the coolant line and the refrigerant line to thy the evaporator using the waste heat of heat source components of the vehicle.

In view of the forgoing, a vehicle cooling/heating system according to the present disclosure may include: a coolant line in which coolant is circulated between a heat source component of a vehicle that provides waste heat and a chiller; a refrigerant line in which refrigerant is circulated through a compressor, a condenser, an expansion valve, and an evaporator, wherein the refrigerant line is configured to perform indoor cooling through the evaporator; and a controller configured to: control the coolant line such that, during a drying mode in which it is necessary to dry the evaporator, the coolant in the coolant line is circulated or not circulated through the heat source component and the chiller; and control the coolant line such that the refrigerant in the refrigerant line flows in an order of the compressor, the evaporator, and the chiller.

The heat source component of the vehicle may include an electronic driving unit or a high-voltage battery, and the coolant line may include a first cooling line configured to allow the coolant to be circulated between the electronic driving unit and a radiator or the chiller, or a second cooling line configured to allow the coolant to be circulated between the high-voltage battery and the radiator or the chiller. The second cooling line may include a water-heating heater at a point downstream of the high-voltage battery. The first cooling line and the second cooling line may be connected together to the integrated reservoir to mix some of the coolants in the first cooling line and the second cooling line with each other.

A first expansion valve may be provided at a refrigerant inlet of the chiller, and a second expansion valve may be provided at a refrigerant inlet of the evaporator. During the drying mode using the first cooling line, the controller may be configured to control the coolant in the first cooling line to be circulated between the electronic driving unit and the chiller and control the refrigerant line such that the refrigerant in the refrigerant line flows in the order of the compressor, the evaporator, the first expansion valve, and the chiller.

During the drying mode using the first cooling line, the controller may be configured to control the refrigerant line such that the refrigerant in the refrigerant line is compressed in the compressor, condensed in the evaporator, expanded in the first expansion valve, and evaporated in the chiller. During the king mode using the second cooling line, the controller may be configured to control the coolant in the second cooling line to be circulated between the high-voltage battery and the chiller and may control the refrigerant line such that the refrigerant in the refrigerant line flows in the order of the compressor, the evaporator, the first expansion valve, and the chiller.

Additionally, during the king mode using the second cooling line, the controller may be configured to control the refrigerant line such that the refrigerant in the refrigerant line is compressed in the compressor, condensed in the evaporator, expanded in the first expansion valve, and evaporated in the chiller. The condenser may include an internal condenser and an external condenser, and during the indoor cooling, the controller may be configured to control the refrigerant line such that the refrigerant flows in the order of the compressor, the internal condenser, the external condenser, the second expansion valve, and the evaporator.

The refrigerant line may be provided with a drying line configured to cause the refrigerant flowing through the evaporator to branch off from an upstream side of the compressor to bypass the compressor and to flow into the external condenser. During the drying mode, the controller may be configured to control the refrigerant line such that the refrigerant flows in the order of the compressor, the evaporator, the external condenser, and the chiller.

The refrigerant line may include a drying line that branches off from a downstream side of the evaporator and is connected to a third expansion valve provided upstream of the external condenser, and during the king mode, the controller may be configured to control the refrigerant discharged from the evaporator to flow in the order of the third expansion valve, the external condenser, the chiller, and the compressor through the king line. During the drying mode using the drying line, the controller may be configured to control the refrigerant line such that the refrigerant in the refrigerant line is compressed in the compressor, condensed in the evaporator, expanded in the third expansion valve, and evaporated in the external condenser and the chiller.

According to the present disclosure, with the vehicle cooling/heating system that includes a coolant line and a refrigerant line, during the drying mode in which it is necessary to dry the evaporator, it is possible for a controller to control the coolant line and the refrigerant line to dry the evaporator using the waste heat of heat source components of the vehicle. Accordingly, it is possible to ensure the hygiene of a vehicle air conditioner evaporator.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
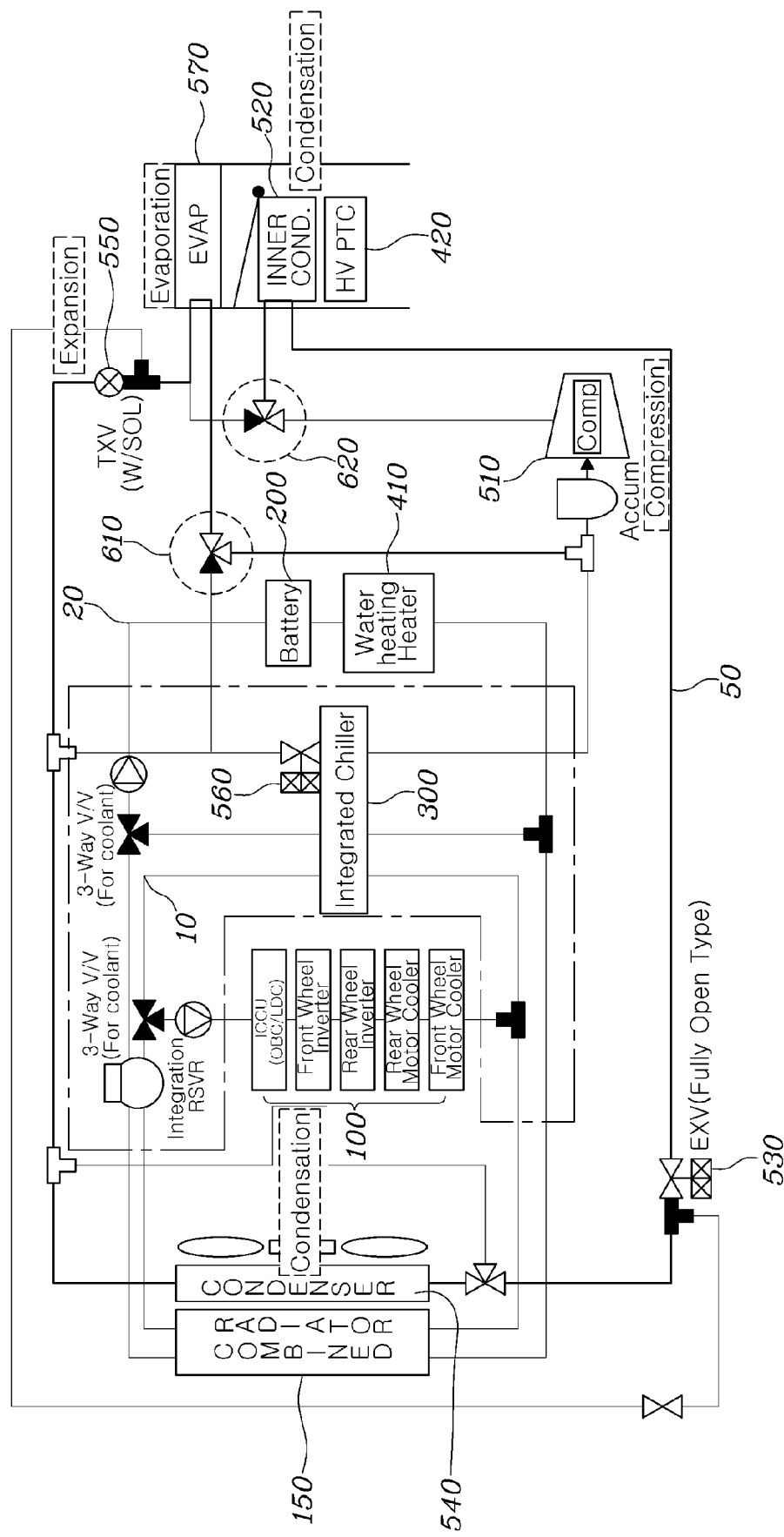
FIG. 1 is a circuit diagram illustrating a vehicle cooling/heating system according to an embodiment of the present disclosure.
Figure 2:
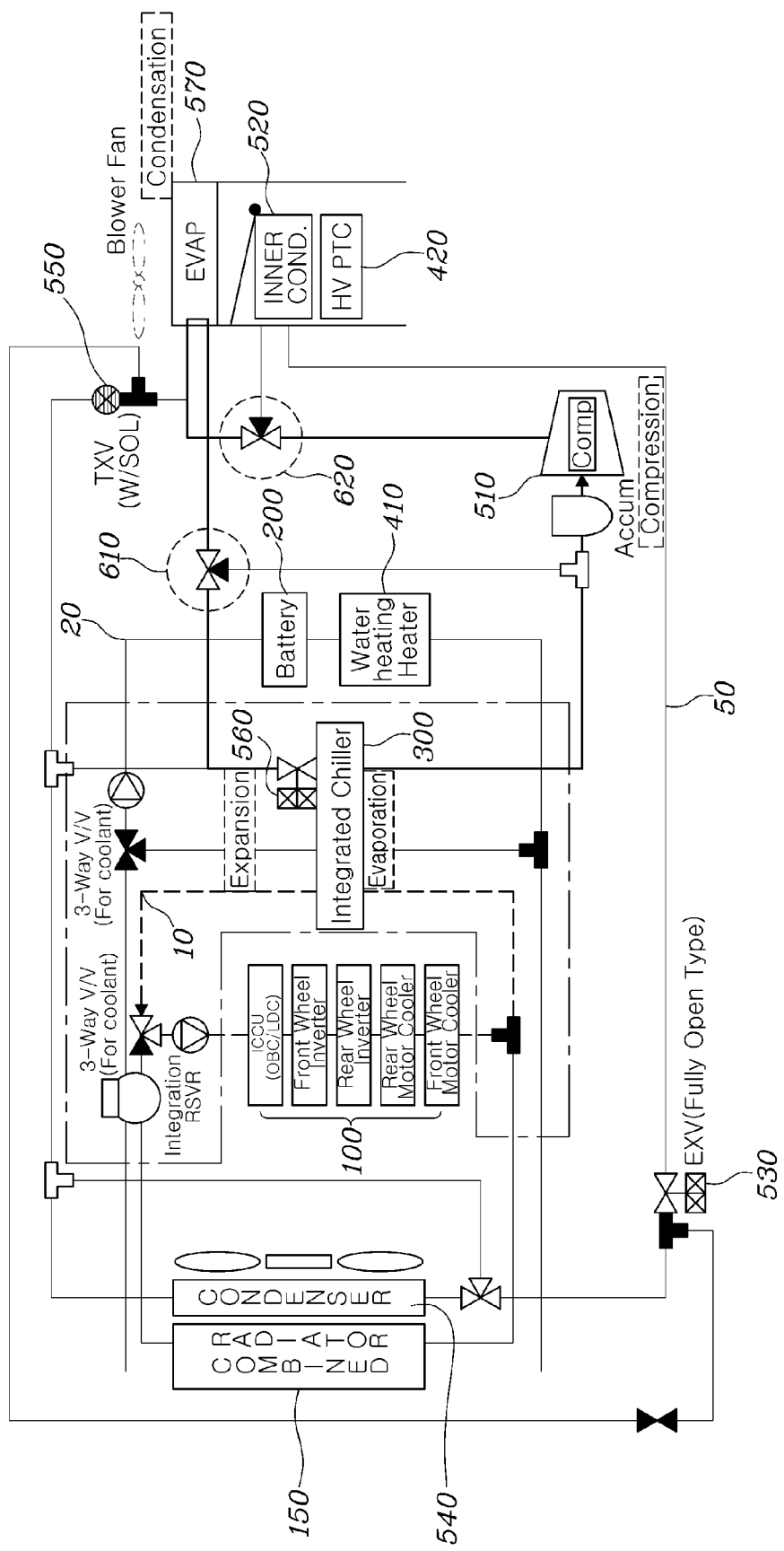
FIG. 2 is a circuit diagram illustrating an evaporator king mode using waste heat of an electronic driving unit in a vehicle heating/cooling system according to an embodiment of the present disclosure.
Figure 3:
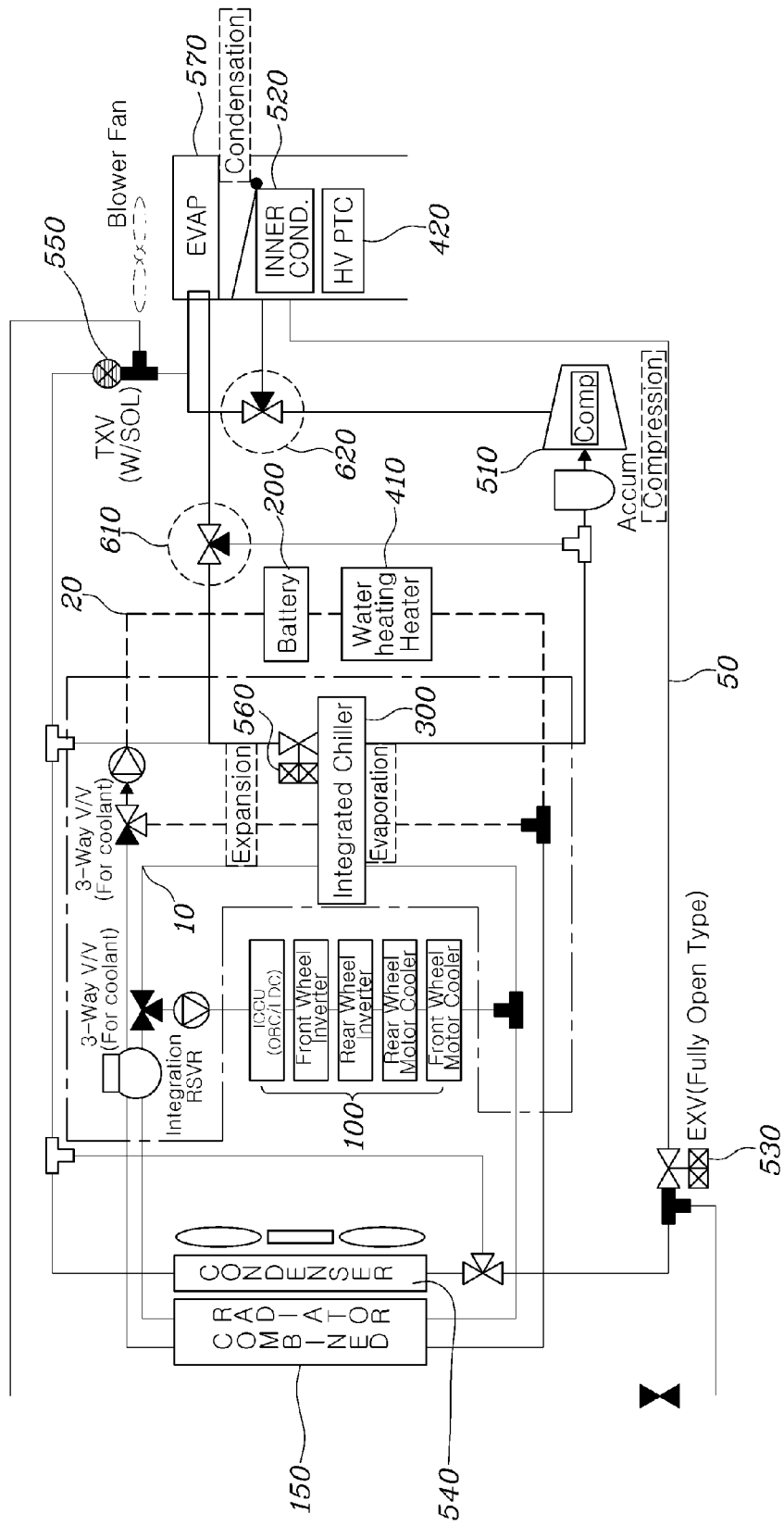
FIG. 3 is a circuit diagram illustrating an evaporator king mode using waste heat of a high-voltage battery in a vehicle heating/cooling system according to an embodiment of the present disclosure.
Figure 4:
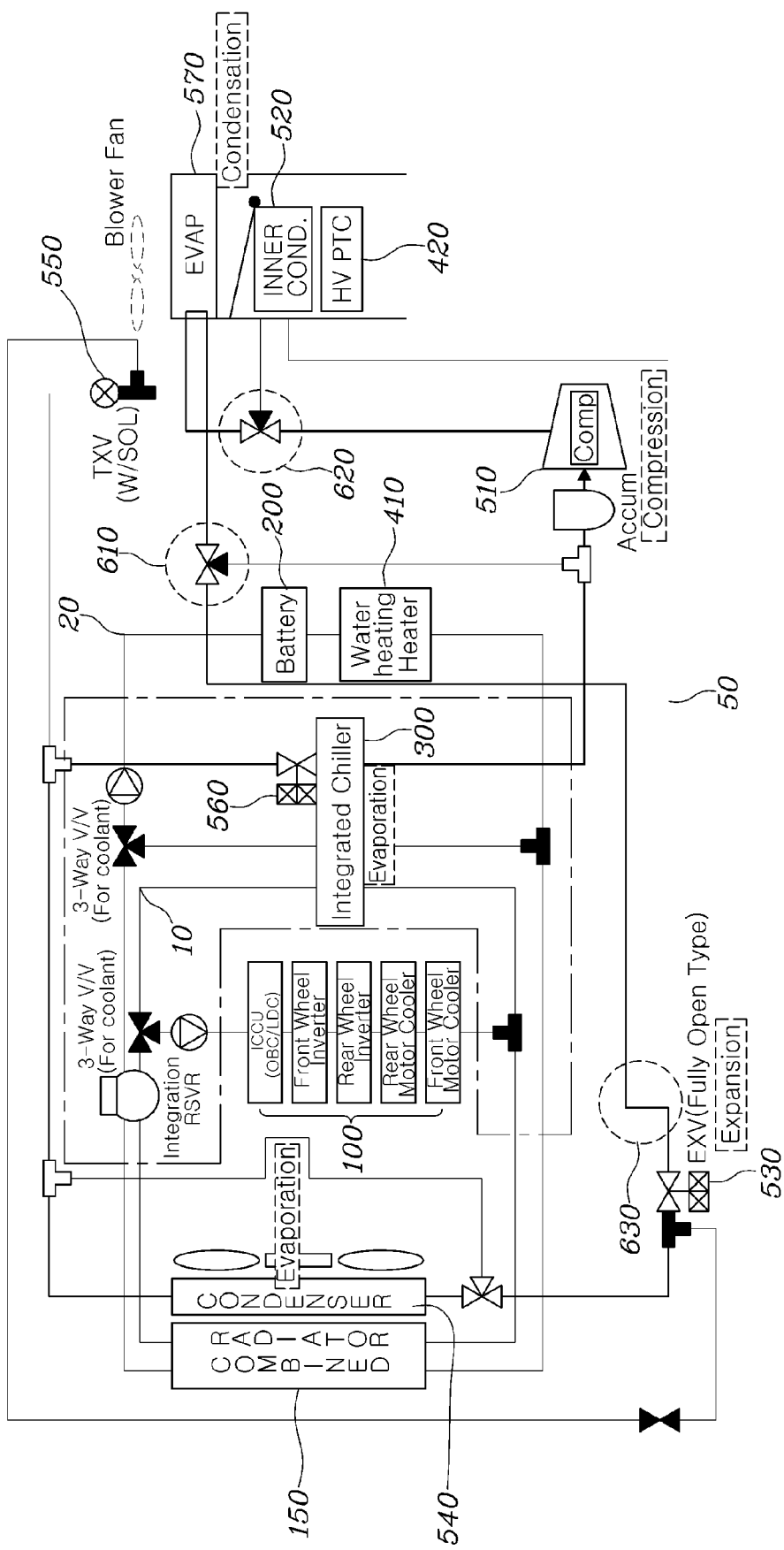
FIG. 4 is a circuit diagram illustrating an evaporator drying mode using ambient air in a vehicle heating/cooling system according to an embodiment of the present disclosure.

FIG. 1 is a circuit diagram illustrating a vehicle cooling/heating system according to an embodiment of the present disclosure. FIG. 2 is a circuit diagram illustrating an evaporator drying mode using waste heat of an electronic driving unit in a vehicle heating/cooling system according to an embodiment of the present disclosure. FIG. 3 is a circuit diagram illustrating an evaporator drying mode using waste heat of a high-voltage battery in a vehicle heating/cooling system according to an embodiment of the present disclosure. FIG. 4 is a circuit diagram illustrating an evaporator drying mode using ambient air in a vehicle heating/cooling system according to an embodiment of the present disclosure.

FIG. 1 is a circuit diagram illustrating a vehicle cooling/heating system according to an embodiment of the present disclosure. A vehicle cooling/heating system according to an embodiment of the present disclosure may include: a coolant line 10 or 20 in which coolant is circulated between a heat source component 100 or 200 of a vehicle that provides waste heat and a chiller 300; a refrigerant line 50 in which refrigerant is circulated through a compressor 510, a condenser 520 or 540, an expansion valve 550 or 560, and an evaporator 570, and which is configured to perform indoor cooling through the evaporator 570; and a controller (not illustrated) configured to: control the coolant line 10 or 20 such that, during a drying mode in which it is necessary to dry the evaporator 570, the coolant in the coolant line 10 or 20 is circulated or not circulated through the heat source component 100 or 200 and the chiller 300; and control the coolant line such that the refrigerant in the refrigerant line flows in the order of the compressor 510, the evaporator 570, and the chiller 300.

In addition, in the vehicle cooling/heating system according to an embodiment of the present disclosure, the heat source component of the vehicle may include an electronic driving unit 100 or a high-voltage battery 200, and the coolant line may include a first cooling line 10 configured to allow the coolant to be circulated between the electronic driving unit 100 and a radiator 150 or the chiller 300, or a second cooling line 20 configured to allow the coolant to be circulated between the high-voltage battery 200 and the radiator 150 or the chiller 300.

Meanwhile, in the vehicle cooling/heating system according to the embodiment of the present disclosure, the second cooling line 20 may include a water-heating heater 410 at a point downstream of the high-voltage battery 200. In addition, in the vehicle cooling/heating system according to the embodiment of the present disclosure, the first cooling line 10 and the second cooling line 20 may be connected together to an integrated reservoir to mix some of the coolants in the first cooling line and the second cooling line with each other.

FIG. 2 is a circuit diagram illustrating an evaporator king mode using waste heat of an electronic driving unit in a vehicle heating/cooling system according to an embodiment of the present disclosure. FIG. 3 is a circuit diagram illustrating an evaporator drying mode using waste heat of a high-voltage battery in a vehicle heating/cooling system according to an embodiment of the present disclosure. In the vehicle cooling/heating system according to an embodiment of the present disclosure, a first expansion valve 560 may be provided at the refrigerant inlet of the chiller 300, and a second expansion valve 550 may be provided at the refrigerant inlet of the evaporator 570.

In addition, in the vehicle cooling/heating system according to an embodiment of the present disclosure, during the king mode using the first cooling line 10, the controller may be configured to control the coolant of the first cooling line 10 to be circulated between the electronic driving unit 100 and the chiller 300 and control the refrigerant line such that the refrigerant in the refrigerant line flows in the order of the compressor 510, the evaporator 570, the first expansion valve 560, and the chiller 300.

Meanwhile, during the king mode using the first cooling line 10, the controller may be configured to control the refrigerant line to cause the refrigerant in the refrigerant line to be compressed in the compressor 510, condensed in the evaporator 570, expanded in the first expansion valve 560, and evaporated in the chiller 300. Accordingly, the waste heat generated in the electronic driving unit 100 may be exchanged with the refrigerant line 50 through the chiller 300, and the refrigerant line finally uses the waste heat generated in the electronic driving unit 100 to dry the evaporator 570. As a result, it is possible to prevent mold, bacteria, and the like from occurring in the evaporator 570.

In addition, in the vehicle cooling/heating system according to an embodiment of the present disclosure, during the drying mode using the second cooling line 20, the controller may be configured to control the coolant of the second cooling line 20 to be circulated between the high-voltage battery 200 and the chiller 300 and the refrigerant line to cause the refrigerant in the refrigerant line to flow in the order of the compressor 510, the evaporator 570, the first expansion valve 560, and the chiller 300.

Meanwhile, during the king mode using the second cooling line, the controller may be configured to control the refrigerant line to cause the refrigerant in the refrigerant line to be compressed in the compressor 510, condensed in the evaporator 570, expanded in the first expansion valve 560, and evaporated in the chiller 300. Similarly, the waste heat generated in the high-voltage battery 200 may be exchanged with the refrigerant line 50 through the chiller 300, and the refrigerant line finally uses the waste heat generated in the high-voltage battery 200 to dry the evaporator 570. As a result, it is possible to prevent mold, bacteria, and the like from occurring in the evaporator 570.

FIG. 4 is a circuit diagram illustrating an evaporator drying mode using ambient air in a vehicle heating/cooling system according to an embodiment of the present disclosure. In the vehicle cooling/heating system according to an embodiment of the present disclosure, the condenser may include an internal condenser 520 and an external condenser 540, and during the indoor cooling, the controller may be configured to control the refrigerant line such that the refrigerant flows in the order of the compressor 510, the internal condenser 520, the external condenser 540, the second expansion valve 550, and the evaporator 570.

Meanwhile, in the vehicle cooling/heating system according to an embodiment of the present disclosure, a drying line 630 may be provided in the refrigerant line to cause the refrigerant flowing through the evaporator 570 to branch off from the upstream side of the compressor 510 to bypass the compressor 510 and to flow into the external capacitor 540. In addition, in the vehicle cooling/heating system according to an embodiment of the present disclosure, during the drying mode, the controller may be configured to control the refrigerant line to flow in the order of the compressor 510, the evaporator 570, the external condenser 540, and the chiller 300.

Further, in the vehicle cooling/heating system according to an embodiment of the present disclosure, the refrigerant line may include a king line 630 that branches off from the downstream side of the evaporator 570 and is connected to a third expansion valve 530 provided upstream of the external condenser 540, and during the king mode, the controller may be configured to control the refrigerant discharged from the evaporator 570 to flow in the order of the third expansion valve 530, the external capacitor 540, the chiller 300, and the compressor 510 through the drying line 630.

In addition, during the drying mode using the drying line 630, the controller may be configured to control the refrigerant line to cause the refrigerant in the refrigerant line to be compressed in the compressor 510, condensed in the evaporator 570, expanded in the third expansion valve 530, and evaporated in the external condenser 540 and the chiller 300. Accordingly, when the waste heat of the electronic driving unit 100 and the high-voltage battery 200 of the vehicle is not generated, it is possible to prevent mold, bacteria, etc. from being generated in the evaporator 570 by condensing and drying the evaporator using the heat of ambient air outside the vehicle.

The vehicle cooling/heating system according to an embodiment of the present disclosure is capable of condensing the evaporator using the waste heat generated in the electronic driving unit 100 or the high-voltage battery 200 to maintain the evaporator in a dry state. Thus, it is possible to prevent the propagation of mold, bacteria, etc. If necessary, it may be possible to more effectively dry the residual moisture in the evaporator and an HVAC by operating a blower together with the vehicle cooling/heating system.

While specific embodiments of the present disclosure have been illustrated and explained, it will be obvious to a person ordinarily skilled in the art that the present disclosure may be variously modified and changed without departing from the scope of the technical idea of the present disclosure, which is defined by the accompanying claims.

What is claimed is:
1. A vehicle cooling/heating system, comprising:
a coolant line in which coolant is circulated between a heat source component of a vehicle that provides waste heat and a chiller;
a refrigerant line in which refrigerant is circulated through a compressor, a condenser, an evaporator, and a chiller, wherein the refrigerant line is configured to perform indoor cooling through the evaporator; and a controller configured to: control the coolant line such that, during a drying mode in which it is necessary to dry the evaporator, the coolant in the coolant line is circulated or not circulated through the heat source component and the chiller, and such that the refrigerant in the refrigerant line flows, in order, through the compressor, the evaporator, and the chiller.

2. The vehicle cooling/heating system of claim 1, wherein the heat source component of the vehicle includes an electronic driving unit or a high-voltage battery, and the coolant line includes a first cooling line configured to allow the coolant to be circulated between the electronic driving unit and a radiator or the chiller, or a second cooling line configured to allow the coolant to be circulated between the high-voltage battery and the radiator or the chiller.

3. The vehicle cooling/heating system of claim 2, wherein the second cooling line includes a water-heating heater at a point downstream of the high-voltage battery.

4. The vehicle cooling/heating system of claim 2, wherein the first cooling line and the second cooling line are both connected to an integrated reservoir to mix some of the coolant in the first cooling line and in the second cooling line.

5. The vehicle cooling/heating system of claim 2, further comprising:
   a first expansion valve provided at a refrigerant inlet of the chiller; and
   a second expansion valve provided at a refrigerant inlet of the evaporator.

6. The vehicle cooling/heating system of claim 5, wherein the controller is configured to control, during the drying mode using the first cooling line, the coolant in the first cooling line to be circulated between the electronic driving unit and the chiller and control the refrigerant line such that the refrigerant in the refrigerant line flows in an order of the compressor, the evaporator, the first expansion valve, and the chiller.

7. The vehicle cooling/heating system of claim 6, wherein the controller is configured to control, during the drying mode using the first cooling line, the refrigerant line to cause the refrigerant in the refrigerant line to be compressed in the compressor, condensed in the evaporator, expanded in the first expansion valve, and evaporated in the chiller.

8. The vehicle cooling/heating system of claim 5, wherein the controller is configured to control, during the drying mode using the second cooling line, the coolant in the second cooling line to be circulated through the high-voltage battery and the chiller, and control the refrigerant line such that the refrigerant in the refrigerant line flows in an order of the compressor, the evaporator, the first expansion valve, and the chiller.

9. The vehicle cooling/heating system of claim 8, wherein the controller is configured to control, during the drying mode using the second cooling line, the refrigerant line to cause the refrigerant in the refrigerant line to be compressed in the compressor, condensed in the evaporator, expanded in the first expansion valve, and evaporated in the chiller.

10. The vehicle cooling/heating system of claim 5, wherein the condenser includes an internal condenser and an external condenser, and the controller is configured to control, during the indoor cooling, the refrigerant line to cause the refrigerant to flow, in order, through the compressor, the internal condenser, the external condenser, the second expansion valve, and the evaporator.

11. The vehicle cooling/heating system of claim 10, wherein the cooling line includes a drying line that causes the refrigerant flowing through the evaporator to branch off from an upstream side of the compressor to bypass the compressor and to flow into the external condenser.

12. The vehicle cooling/heating system of claim 10, wherein the controller is configured to control, during the drying mode, the refrigerant line to cause the refrigerant to flow in an order of the compressor, the evaporator, the external condenser, and the chiller.

13. The vehicle cooling/heating system of claim 12, wherein the refrigerant line includes a drying line that branches off from a downstream side of the evaporator and is connected to a third expansion valve provided upstream of the external condenser, and the controller is configured to control, during the drying mode, the refrigerant discharged from the evaporator to flow in an order of the third expansion valve, the external condenser, the chiller, and the compressor through the drying line.

14. The vehicle cooling/heating system of claim 13, wherein the controller is configured to control, during the drying mode using the drying line, the refrigerant line to cause the refrigerant in the refrigerant line to be compressed in the compressor, condensed in the evaporator, expanded in the third expansion valve, and evaporated in the external condenser and the chiller.

* * * * *